United States Patent [19]

Brodmann et al.

[11] Patent Number: 5,398,901
[45] Date of Patent: Mar. 21, 1995

[54] SUPPORT APPARATUS

[75] Inventors: Harry Brodmann, West Midlands; David A. Woodhall, Staffordshire, both of United Kingdom

[73] Assignee: Haropa Products Limited, West Midlands, United Kingdom

[21] Appl. No.: 136,563

[22] Filed: Oct. 12, 1993

[30] Foreign Application Priority Data

Oct. 10, 1992 [GB] United Kingdom ............... 9221331
May 20, 1993 [GB] United Kingdom ............... 9310474

[51] Int. Cl.6 .................................................. A47F 5/00
[52] U.S. Cl. ............................. 248/288.1; 248/181; 248/921
[58] Field of Search ............... 248/289.1, 288.1, 349, 248/279, 181, 923, 921, 922

[56] References Cited

U.S. PATENT DOCUMENTS

| 805,074 | 11/1905 | Kemp ............................. 248/288.1 X |
| 1,339,449 | 5/1920 | Frisbie ............................. 248/288.1 |
| 2,634,935 | 4/1953 | Carpenter ....................... 248/289.1 X |
| 2,893,674 | 7/1959 | Monaco ............................. 248/921 |
| 3,944,178 | 3/1976 | Greenwood ................... 248/288.1 X |
| 4,354,654 | 10/1982 | Werner ............................. 248/921 |
| 4,483,503 | 11/1984 | Gahan ............................. 248/181 X |
| 4,516,751 | 5/1985 | Westbrook . |
| 4,549,710 | 10/1985 | Prince et al. . |
| 4,562,987 | 1/1986 | Leeds et al. . |
| 4,562,988 | 1/1986 | Bumgardner ....................... 248/349 |
| 4,687,170 | 8/1987 | Beaver ........................... 248/289.1 X |
| 4,708,312 | 11/1987 | Rohr ............................. 248/279 X |
| 4,768,744 | 9/1988 | Leeds et al. . |
| 5,109,411 | 4/1992 | O'Connell . |

FOREIGN PATENT DOCUMENTS

| 0062980 | 10/1982 | European Pat. Off. . |
| 0184353 | 6/1986 | European Pat. Off. . |
| 3415850 | 4/1984 | Germany . |
| 2249944 | 5/1992 | United Kingdom . |
| 2250181 | 6/1992 | United Kingdom . |
| 8200946 | 4/1982 | WIPO . |
| 8300008 | 1/1983 | WIPO . |
| 8303743 | 11/1983 | WIPO . |

*Primary Examiner*—J. Franklin Foss
*Attorney, Agent, or Firm*—Smith-Hill and Bedell

[57] ABSTRACT

A support for a television etc. has a platform 12 with a central spherical recess 18. The recess sits on a support member 22 which can slide along an arm 28. A bolt 30 extends down through a slot 20 in the recess 18, through apertures or bores 34 in the arm 28 and engages a member 42. The recess 18 forms a ball and socket joint on the member 22 which allows the platform to be tilted and swiveled unless the member 42 is tightened sufficiently to clamp the sliding surfaces together, preventing further movement.

15 Claims, 3 Drawing Sheets

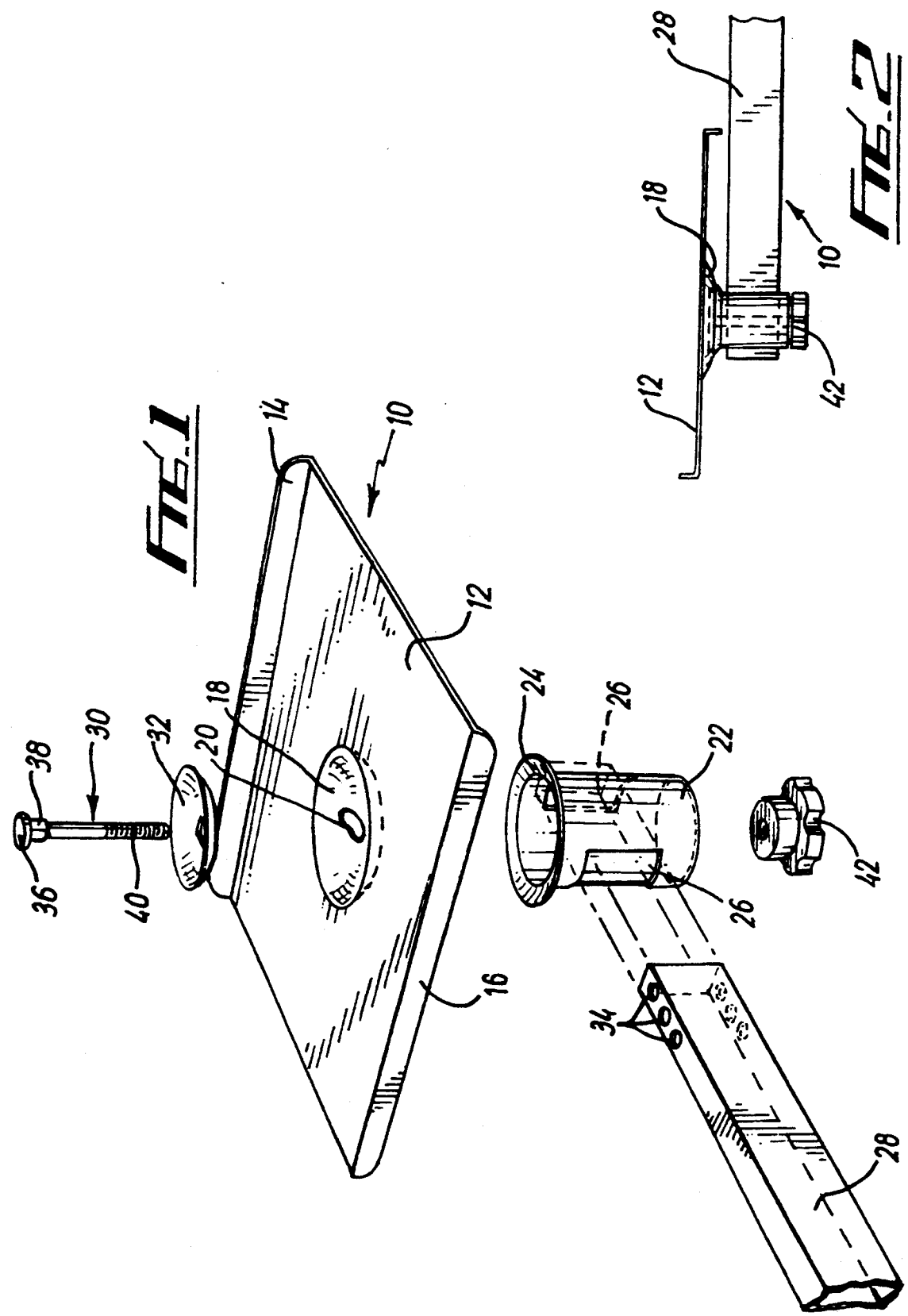

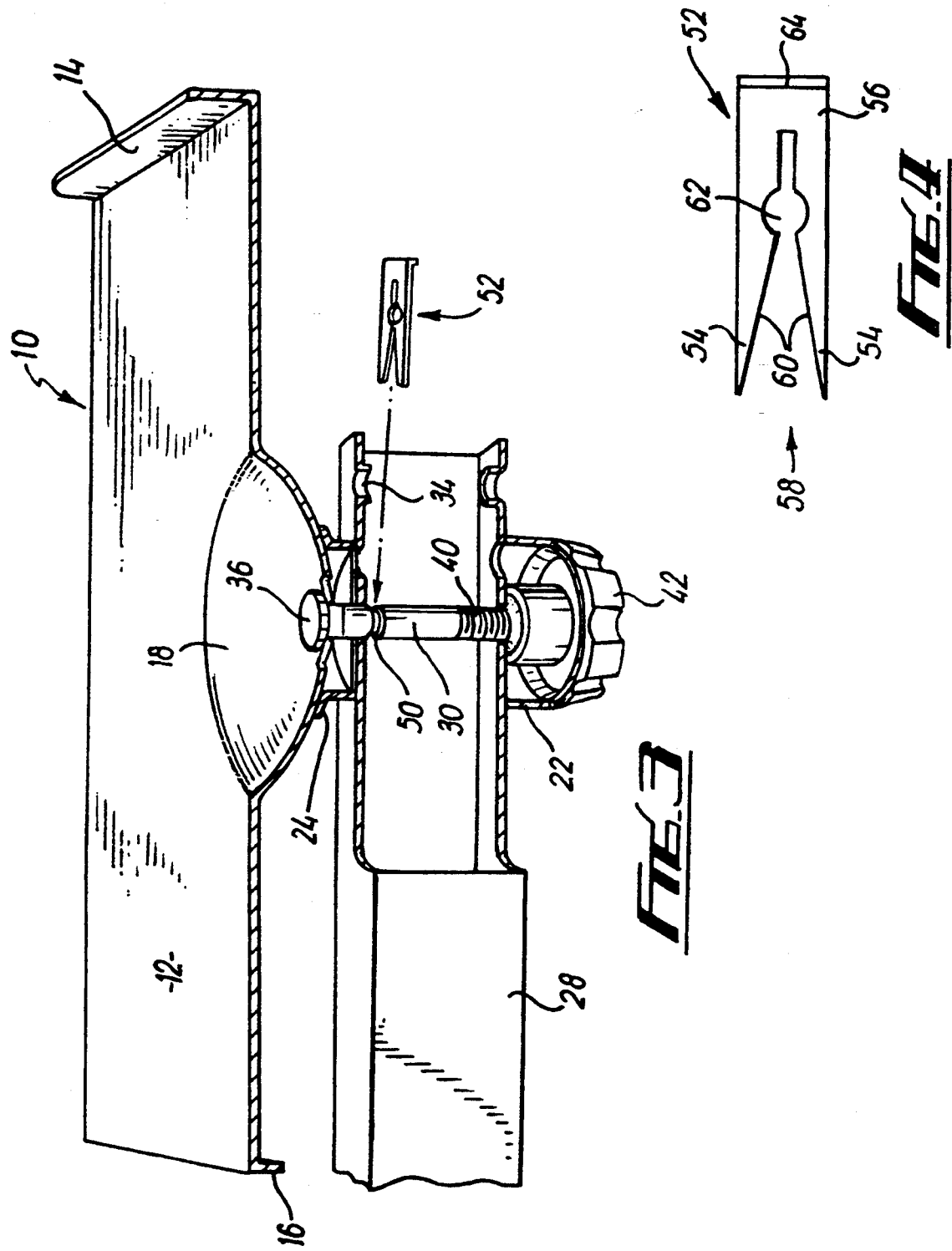

SUPPORT APPARATUS

This invention concerns support apparatus, particularly but not exclusively apparatus for supporting televisions and other similar articles, and especially such apparatus mountable on a wall or other fixture.

When supporting televisions on a wall or other fixture it is important that the television is securely supported but can be adjustably positioned for the comfort of the viewer.

According to the present invention there is provided support apparatus comprising a mounting arrangement for mounting the apparatus on a fixture, means defining a support surface for an article to be supported, a plurality of surfaces which slide relative to each other to allow the support surface defining means to move relative to the mounting arrangement, and locking means releasably operable to prevent the said surfaces sliding relative to each other, thereby locking the support surface defining means relative to the mounting arrangement.

The locking means may be operable to clamp the surfaces together to prevent relative movement. The surfaces may be spherical or part-spherical.

The locking means preferably comprises a bolt upon which a threaded member is engagable such that relative rotation causes locking. The bolt preferably extends through the sliding surfaces.

The apparatus is preferably constructed such that the bolt does not extend into or above the support surface.

Preferably at least part of the locking means is recessed into the apparatus, to prevent tampering. The recessed part may be covered by cover means, during use.

Preferably retaining means are provided to retain the sliding surfaces generally proximate each other when the locking means are released. The retaining means may be operable to prevent or limit movement of the bolt through the sliding surfaces. The retaining means may comprise a stop member mountable on the bolt and so shaped as to bear on another member to prevent the sliding surfaces moving apart by more than a pre-determined amount. The stop member may comprise a resilient clip member.

The support surface defining means preferably comprises a substantially planar component defining the support surface, with a substantially part spherical recess, the underside of the recess engaging on a support member across which the recess is slidable when the locking means is unlocked.

There may be an opening in the recess, through which the bolt extends, in use. An upper part of the bolt shank is preferably shaped so as to prevent rotation thereof in the opening in the recess. A washer is preferably provided between the bolt head and the recess, and the washer desirably has a profile substantially corresponding to that of the recess.

The opening in the recess is preferably a slot which permits tilting of the support surface relative to the mounting arrangement.

An abutment is preferably provided on the support surface defining means to prevent articles sliding from the support surface, and the abutment desirably extends substantially perpendicularly to the longitudinal axis of the slot.

The support member is preferably generally cylindrical with a through passage through which an elongate part of the mounting arrangement extends. A through opening is preferably provided in the portion of said elongate part locatable within the support member. The bolt preferably extends through said opening with the threaded member engagable against said elongate part to lock the bolt.

A plurality of spaced through openings may be provided in said elongate part with the bolt extendable through any required one of said openings so as to permit the spacing of the support surface from a fixture to be varied.

An embodiment of the present invention and a modification will now be described by way of example only with reference to the accompanying drawing, in which:

FIG. 1 is a diagrammatic exploded perspective view of a support apparatus according to the invention;

FIG. 2 is a diagrammatic side view of the assembled apparatus of FIG. 1, on a reduced scale;

FIG. 3 is a cut-away perspective view of a modified embodiment, on an enlarged scale;

FIG. 4 is a plan view of a clip used in the embodiment of FIG. 3, on an even larger scale.

Figure 5:
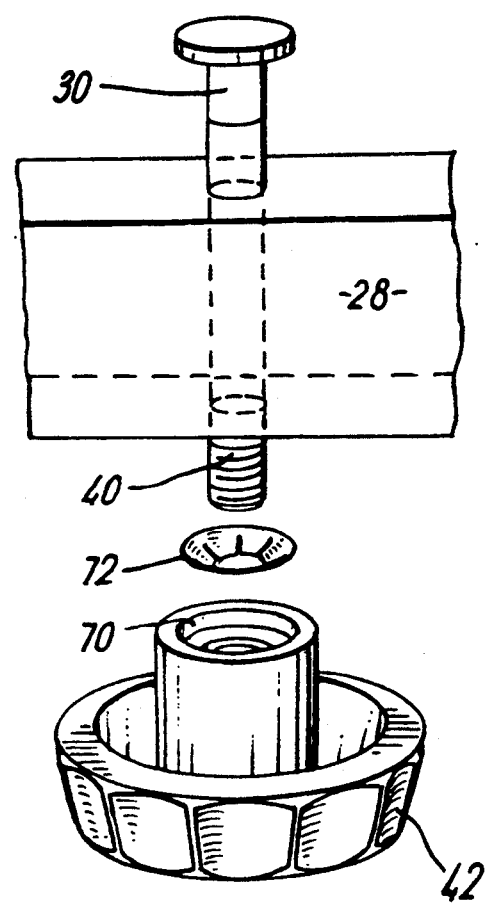
FIG. 5 is a partial exploded view, with various parts removed for clarity, of a further modified embodiment.

The drawings show apparatus 10 for supporting an article such as a television (not shown). The apparatus 10 comprises a substantially planar rectangular platform 12 with an upturned front edge 14 and a down turned rear edge 16. A part spherical recess 18 is provided substantially centrally in the platform 12, so that the lower surface of the platform 12 has a corresponding prominence. A slot 20 with its longitudinal direction perpendicular to the edges 14, 16 is provided in the floor of the recess 20.

The platform 12 is supported on a support member 22 upon which the underside of the recess 18 rests. The member 22 is generally cylindrical, being hollow and with open ends, and extending generally vertically. The upper edge 24 of the member 22 is swaged outwardly to form a lip which substantially corresponds in profile to the underside of the recess 18. Two diametrically opposed rectangular openings 26 are provided in the sides of the support member 22. A rectangular section bar 28 of a wall mounting arrangement (only the terminal portion of which is shown) slidingly extends through the openings 26. The wall mounting arrangement may take any appropriate form and may permit pivotal movement of the bar 28 relative to a wall and perhaps also height adjustment.

For connecting together the above described components a bolt 30 is provided which extends through a washer 32 located in the recess 18, the slot 20 and into the support member 22. The washer 32 is of part spherical shape corresponding to the recess 18. A plurality of spaced passages 34 are provided extending substantially vertically through the bar 28. The bar 28 is located in the member 20 such that the bolt 30 passes through a selected one of the passages 34 to provide a required spacing from the wall. The passages 34 may be formed by bores through a solid bar, but are preferably apertures in the upper and lower surfaces of a hollow section. The bolt 30 has a head 36 of a size which cannot pass through the washer 32. A part 38 of the shank of the bolt 30 immediately below the head 36 is of square section of a size to slidingly fit through the slot 20 but to prevent rotation therein. A lower part 40 of the bolt 30 is threaded and is engagable with a female threaded member 42 below the bar 28. The member 42 is shaped with peripheral finger grips to readily permit turning thereof by hand.

In use, when the apparatus 10 is assembled as described above, the member 42 can be tightened on the bolt 30 against the underside of the bar 28 to provide a rigid support apparatus. This pulls the washer 32 down towards the edge 24, gripping the platform 12 therebetween. With sufficient tightening, friction between the various spherical surfaces will prevent the platform moving relative to the bar 28, even when carrying a heavy load such as a television set.

If the member 42 is loosened on the bolt 30, the underside of the recess 18 can slide on the edge 24, in the manner of a ball-and-socket joint. The platform 12 can be rotated relative to the support member 22, and can also be tilted with the part 38 of the shank sliding backwards or forwards relative to the slot 20. Thereby a required orientation of the television can be achieved. The edge 14 prevents the television from sliding forwards off the platform 12 when tilted.

FIG. 3 shows apparatus which is the same as that described above in almost all respects, but slightly modified to improve safety during use. In the arrangement of FIG. 2, a problem may arise if the member 42 is sufficiently loosened on the bolt 30 that it becomes disconnected from the bolt 30 while heavy apparatus such as a television is supported on the platform 12. The apparatus could then tilt forward and overbalance by pulling the prominence 18 out of the support member 22. Clearly this can be dangerous for the operator who has inadvertently disconnected the bolt 30 and the member 42. The modification shown in FIG. 3 seeks to overcome this difficulty. The bolt 30 has a circumferential groove 50 formed near its head, at a position which, in use, will be just within the section of the bar 28, whether the bolt 30 and member 22 are tight to lock the apparatus, or are loose.

A clip 52 can be received in the groove 50 to be mounted on the bolt 30. The clip is shown more clearly in FIG. 4. The clip 52 consists of two fingers 54 connected by a web 56 and between which there is a slot 58. The free ends of the fingers 54 taper to provide lead-in edges 60 at the mouth of the slot. Behind these, the slot has a circular region 62. The clip is made of an appropriate resilient material such as spring steel.

When the apparatus has been assembled as shown in FIG. 3, the clip 52 can be introduced through the free end of the bar 28 until the fingers 54 embrace the bolt 30 in the region of the groove 50. The fingers 54 then enter the groove 50, assisted by the surfaces 60. The fingers 54 must be forced apart to allow the bolt 30 to snap through into the circular region 62. The fingers 54 can then close again around the bolt 30, to hold themselves in position in the groove 50. The edge 64 of the web 56 is turned over to form a flange which assists the user in pushing the clip into position or releasing it.

In use, the clip 52 limits the distance by which the bolt 30 may move (upwardly as shown in FIG. 3), by abutment with the inside surface of the bar 28. Engagement of the clip 52 and the groove 50 prevent the clip being moved axially on the bolt 30. Consequently, even if the member 42 is disengaged from the bolt 30, the bolt 30 can only move up sufficiently to release the sliding surfaces to allow the platform to be reoriented. The bolt cannot be pulled out of the bar 28 to allow the platform 12 to fall off. The sliding surfaces are thus retained generally proximate each other at all times, The clip 52 could be replaced with O-rings, circlips or other retaining means.

One example of this is shown in FIG. 5. In this drawing, the platform 12 and cup 22 have been omitted in the interests of clarity. The member 42 has been modified to provide a recess 70 in which a star washer 72 can be received. The star washer (which could alternatively be a lock nut etc.) is normally threaded on to the bolt 30 at 40, but not tightened against the bar 28. Thus, the washer 72 does not clamp the sliding surfaces together to prevent the platform being moved relative to the bar 28, but does retain the sliding surfaces proximate each other in a manner similar to that described above in relation to the clip 52, but by bearing against the lower surface of the bar 28. The member 42 allows the sliding surfaces to be clamped, because it can be threaded on to the bolt 30 and tightened until the washer 72 is received in the recess 70, and the walls of the recess reach passed the washer 72 to bear on the lower surface of the bar 28. Further tightening eventually draws the bolt head down sufficiently to clamp the platform tightly in position. If the member 42 is loosened and accidentally disconnected from the bolt 30, safety is maintained by the presence of the washer 72.

Although the recess is shown in the member 42, it could be provided in another member, such as a recessed washer, which, in use, provides a bridge between the member 42 and the bar 28, allowing the member 42 to be tightened without disturbing the washer 72. The recess 70 in the member 42 would not then be required.

There is thus described apparatus suitable for supporting a television at a required orientation. The apparatus is of relatively simple construction and can thus be inexpensively and robustly manufactured. The components of the apparatus are particularly easily assembled, because no welding is required. The components of the apparatus can be readily assembled and provide a pleasing appearance. It is to be realised that the orientation of the platform and hence television thereon can readily be adjusted by loosening the threaded member and positioning the platform as is required. The shape of the threaded member and the square section of the bolt mean that the apparatus can be easily locked in position and unlocked using only one hand.

Various modifications may be made to the apparatus without departing from the scope of the invention. For example, it may be possible to omit the washer, particularly if the underside of the bolt head was rounded, or to use a small conventional shape washer. The threaded member may take any suitable form, or different means could be used to lock the apparatus in particular orientations. The surfaces could be pulled together for locking by using an over-centring catch arrangement to pull on a bar which takes the place the bolt 30. The locking means (particularly the member 42) may be recessed into the apparatus, and/or covered to prevent tampering, particularly when the arrangement is used in a public place. In particular, the member 42 may be located within a recess in the lower surface of the cup, and the recess closed with a cover or plug, so that the member 42 is normally neither accessible nor visible.

Whilst the described apparatus is particularly intended for supporting televisions it is to be realised that apparatus according to the invention could be used in many other situations for supporting other loads, including appliances such as microwaves, loudspeakers or other audio equipment.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. Support apparatus comprising:
   a mounting arrangement for mounting the apparatus on a fixture, said mounting arrangement having an elongate part,
   a generally cylindrical support member with a through passage through which the elongate part of the mounting arrangement extends,
   a substantially planar component defining a support surface for an article to be supported, the substantially planar component having a substantially part spherical recess, the underside of the recess and the support member having mutually engaging surfaces which slide relative to each other to allow the substantially planar component to slide across the support member, and
   locking means releasably operable to prevent the said surfaces sliding relative to each other, thereby locking the substantially planar component relative to the support member.

2. Apparatus according to claim 1, wherein the locking means are operable to clamp the surfaces together to prevent relative movement.

3. Apparatus according to claim,1, wherein the surfaces are spherical or part-spherical.

4. Apparatus according to claim 1, wherein the locking means comprise a bolt upon which a threaded member is engagable such that relative rotation causes locking.

5. Apparatus according to claim 4, wherein the bolt extends through the sliding surfaces.

6. Apparatus according to claim 4, wherein the bolt does not extend into or above the support surface.

7. Apparatus according to claim 1, wherein at least part of the locking means is recessed into the apparatus to prevent tampering.

8. Apparatus according to claim 7, wherein the recessed part is covered by cover means, during use.

9. Apparatus according to claim 1, wherein retaining means are provided to retain the sliding surfaces generally proximate each other when the locking means are released.

10. Apparatus according to claim 9, wherein a stop member is mountable on a bolt and so shaped as to bear on another member to prevent the sliding surfaces moving apart by more than a pre-determined amount.

11. Apparatus according to claim 9, wherein the stop member is a resilient clip member or star washer.

12. Apparatus according to claim 1, wherein an abutment is provided on the support surface defining means to prevent articles sliding from the support surface.

13. Apparatus according to claim 4, wherein a through opening is provided in the portion of said elongate part locatable within the support member.

14. Apparatus according to claim 13, wherein a plurality of spaced through openings are provided in said elongate part with the bolt extendable through any required one of said openings so as to permit the spacing of the support surface from a fixture to be varied.

15. Apparatus according to claim 4, wherein a through opening is provided in the portion of said elongate part locatable within the support member and the bolt extends through said opening.

* * * * *